A. D. RISLEY.
APPARATUS FOR PHOTOGRAPHIC PORTRAITURE.
APPLICATION FILED JAN. 31, 1913.
1,199,307.
Patented Sept. 26, 1916.
3 SHEETS—SHEET 2.
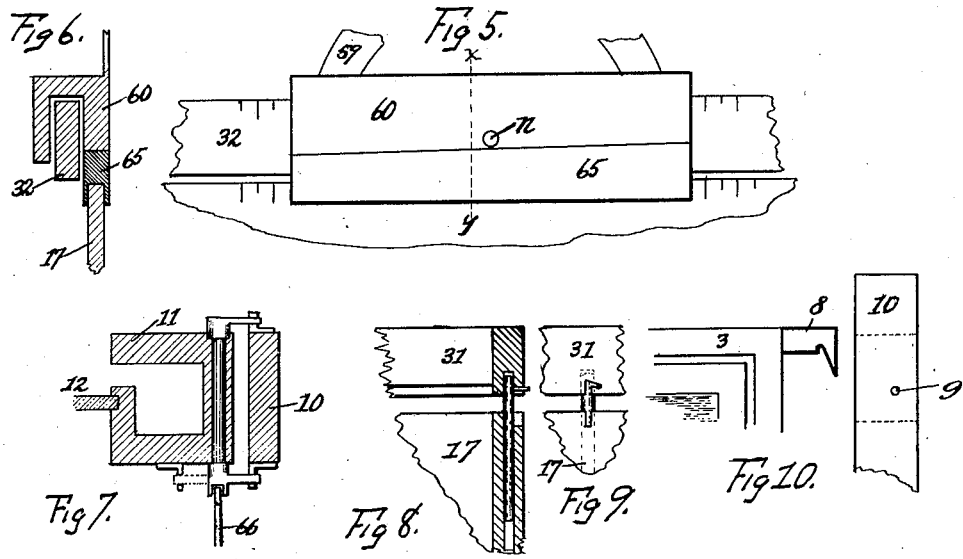
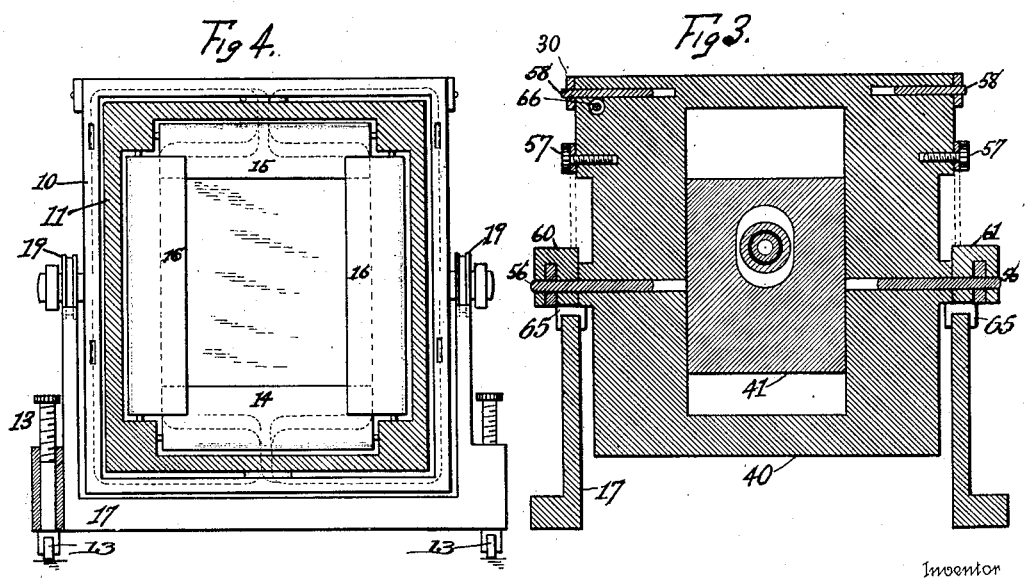

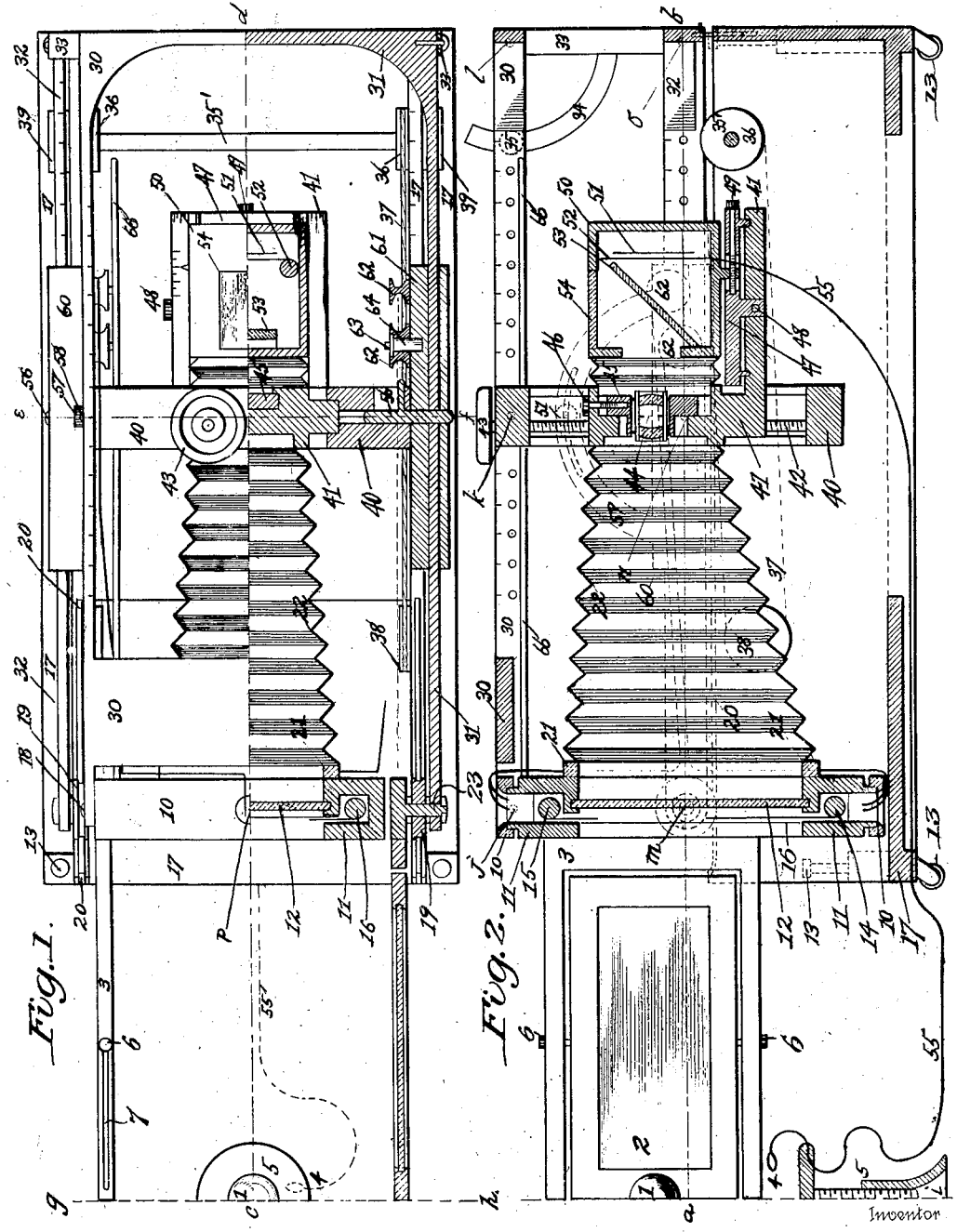

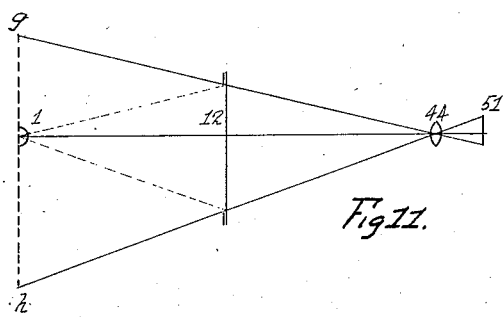
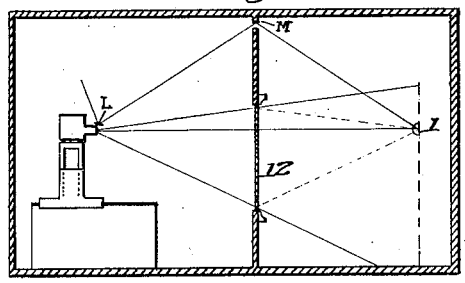
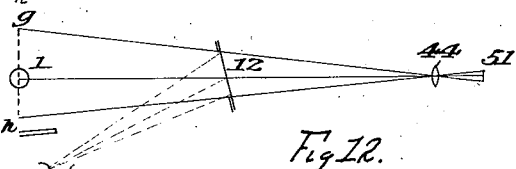
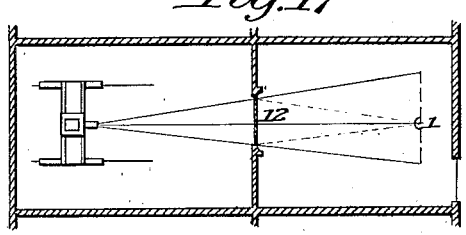
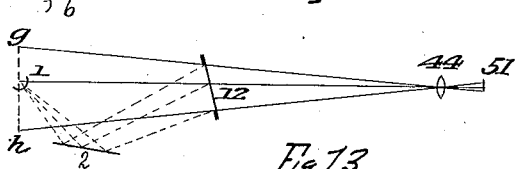
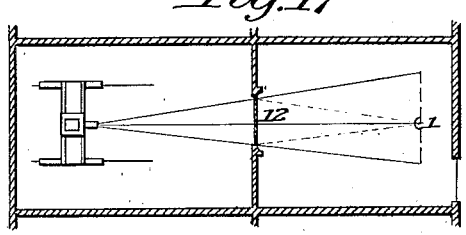
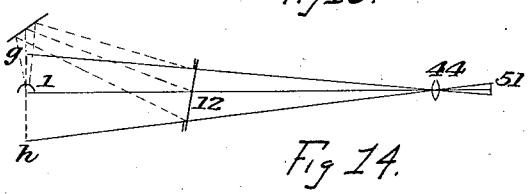
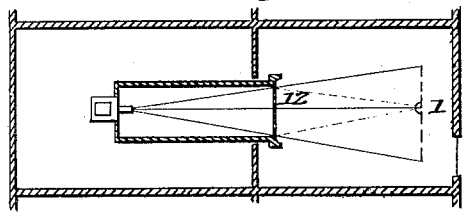
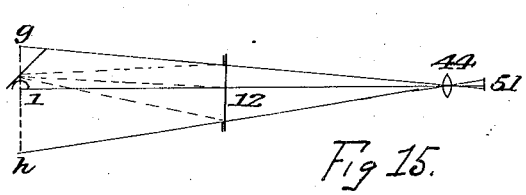
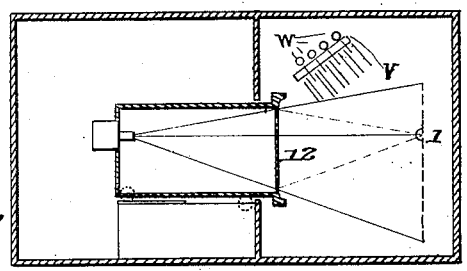

UNITED STATES PATENT OFFICE.

ALLAN D. RISLEY, OF BALTIMORE, MARYLAND.

APPARATUS FOR PHOTOGRAPHIC PORTRAITURE.

1,199,307.  Specification of Letters Patent.  Patented Sept. 26, 1916.

Application filed January 31, 1913. Serial No. 745,404.

*To all whom it may concern:*

Be it known that I, ALLAN D. RISLEY, a citizen of the United States, residing at Baltimore city, in the State of Maryland, have invented a new and useful Improvement in Apparatus for Photographic Portraiture, of which the following is a specification.

My invention relates to improvements in apparatus for photographic portraiture, and the objects of my improvement are: First, to provide means for observing the content of the cones of light whose common apex is a photographic lens without cutting off or destroying the effect of said light. Second, to provide means whereby the sitter for a photographic portrait may observe before and during the exposure an apparent image which is the same in perspective, light and shade, and placing relative to the edges of the plate as the real image simultaneously formed by the lens of the camera to be used in taking said portrait. Third, to provide means whereby a photographer may continuously observe before and during the exposure the image that is formed by the lens and thrown upon the sensitized surface during the exposure. Fourth, to provide means whereby a sitter may pose himself, that is to say, having under observation a similar image to the one formed by the lens; he may be guided thereby in altering his pose to suit himself, and, while holding such pose, may use the means provided to cause the exposure of the plate. Fifth, to provide means whereby a person accompanying the sitter may, as above understood, pose the sitter. Sixth, to provide means whereby a photographer may mechanically direct the poise of the head and the direction and axial accommodation of the eyes of the sitter. Seventh, to provide means whereby the sitter for a photographic portrait, or the sitter and said second person accompanying him may enjoy privacy in posing.

With the above and other objects in view, my invention consists of the novel construction, combination and arrangement of parts herein specifically described and illustrated in the accompanying drawings, wherein is shown the preferred embodiment of the invention, but it is to be understood that changes, variations and modifications can be made therein which come under the scope of the claims hereunto appended.

The embodiment of my invention is illustrated in the accompanying drawings in which—

Figure 1 is a plan of the portable form of the apparatus embodying my improvement, partially in section, the section being taken horizontally on the line ($a\ b$) Fig. 2. Fig. 2 is a section taken vertically on the line $c\ d$ of Fig. 1. Fig. 3 is a section of the camera support, taken on the line $e\ f$ Fig. 1. Fig. 4 is a front elevation of the apparatus shown in Figs. 1 and 2 partly in section. Fig. 5 is a detail showing the manner of fixing the camera upon the base when it is desired to move the transparent reflector separately. Fig. 6 is a section of the same taken on the line $x\ y$ Fig. 5. Fig. 7 is a detail, partly in section, showing the locking device for the transparent reflector. Fig 8 is a detail in section on the line $c\ d$ of Fig. 1 showing the method of locking the carriage upon the base. Fig. 9 is a rear elevation of the same. Fig. 10 is a detail showing the method of attaching the auxiliary mirror used in taking profile or quartering views of the sitter. Figs. 11, 12, 13, 14, 15, and 20 are diagrams of the principal rays in various adjustments of the apparatus. Figs. 17 and 18 are diagrams in plan of two non-portable forms embodying my invention. Figs. 16 and 19 are diagrams in elevation of two non-portable forms embodying my invention.

It is contemplated to use a combination of artificial lights, the one actinically intense, such as the mercury vapor light, and the other designed to correct the color effect, such as colored incandescent lights; all of said lights being so placed as to give the same light and shade to the sitter, as illustrated in Fig. 19, V representing the actinically intense light and W the colored incandescent lights.

Similar characters refer to similar parts throughout the several views.

In Fig. 11, serving for either elevation or plan, the line $g\ h$ represents the plane of the sitter upon which the camera is focused, the semicircle 1 represents the face of the sitter, 12 the transparent reflector, 44 the lens, and 51 the plate; the paths of reflected rays being in dot; as these elements are recognizable in the remaining diagrams they are left unnumbered; each diagram is marked P for plan or E for side elevation. In Fig. 12 the semicircle 6 represents the face of the second person above referred to as posing the sitter. Figs. 13, 14, and 15 illustrate the use of an auxiliary mirror 2, toward which the sitter's gaze is directed.

Fig. 20 illustrates the adjustment of the apparatus while being used by the photographer to direct the poise of the head and axial accommodation of the eyes of the sitter; the photograph resulting from this adjustment will have an upward and far-away gaze.

In Fig. 2 is shown the sitter's station with the adjustable seat 5, the probable position of the sitter's head being represented by the hemisphere 1, the shutter release control by the bulb 4, connected with the shutter release mechanism in the camera-box 50 through the flexible conductor 55, shown in dot. An auxiliary mirror used in profiles is shown at 2, supported at the ends of its vertical axis in the frame 3 and capable of being turned on said axis to any degree and fastened by thumbscrews; said thumbscrews 6 travel in the slotted arms 7 of the mirror support 3 to extend said mirror 2 as may be desired. The mirror support 3 is attached to the frame 10 by two hooks 8, one of which is shown in detail in Fig. 10, allowing said auxiliary mirror to be readily attached or detached.

A main frame, or base 17, having the general form of the two sides and one end of a box rests upon four adjustable casters, one of which is shown in Fig. 4 at 13, and upon which the apparatus may be moved about the floor to be brought into suitable relation to the sitter's station; when the apparatus is used in this way curtains or screens may be placed about the sitter's station to give the sitter the impression of privacy; the rear pair of casters may be extended to tilt the entire apparatus.

In Figs. 1 and 2, the lower pair of bars of the carriage the right lower member of which is designated 31 in Fig. 1 and the left 32 is journaled at its forward end on spur axles 23 secured to the frame 10, on which axles the wheels 19 are also journaled, thus movably supporting the forward end of the carriage on the tracks 20. At the rear end of the carriage its lower pair of bars rest upon wheels 39 as shown in Fig. 1 corresponding to the wheels 19, said wheels 39 being secured to the axle 35 journaled in the base, thus inverting the track at the rear end of the carriage for the sake of compactness. The carriage may be moved without vibration by pulling a belt, 37, situated at either or both hands of the operator, passing over a drum 36 secured to said axle 35′ and over an idler pulley 38 attached to the base near the forward end.

The carriage consists of four principal bars, parallel and rigidly connected at the rear in pairs, the upper and the lower, one bar of each pair being shown in Fig. 2 at 30 and 32, and three of which bars are shown in Fig. 1 at 32, 30 and 31. The upper and lower pairs are connected at the front by the frame 10, to which they are attached by bolts through the centers $j$ and $m$, Fig. 2, on which they are journaled, and at the rear by two uprights, 33 and 33, journaled on bolts through the centers $l$ and $o$ as shown in Fig. 2; the said pairs are fixable at various angles to their connecting members by means of segment 34 and the set screw 35 and a corresponding segment and set screw at the left side.

The transparent reflector 12 shown in section in Figs. 1 and 2, is set in a frame 11 mounted on its vertical axis by hollow trunnions turning in the frame 10, and is locked in the frame 10 so that the reflecting surface lies in the central plane of said frame 10 when making all portraits posed by the sitter himself, having a direct gaze; when a second station is employed, as diagrammed in Fig. 12, or an auxiliary mirror is used, as diagrammed in Figs. 13, 14 and 15, said frame 11 is unlocked by torsion of the rod 66, attached by a universal joint to the locking bolt shaft shown in detail in Fig. 7, turned by thrust of said rod, and re-locked by setting the forward bolt in the rear notch, or the rear bolt in the forward notch. Said transparent reflector frame 11 is recessed as shown in Figs. 1, 2 and 4, to carry spring retracted roller curtains drawn by cords which pass through said hollow trunnions to the operator's station.

The camera box 50, in Fig. 2, connected by a bellows to the camera front 41 rests upon a table 47 and is movable in the direction of the optical axis by the focusing screw 49; said table 47 rests upon the extended base of the camera front 41, and is movable by means of the lateral adjusting screw 48 in a direction horizontal and at right angles to the optical axis. The camera front 41 is movable in grooves in the camera support 40 by means of the elevating screw 42 turned by the hand-wheel 43; the lens-board 45 is moved in grooves in the camera-front 41 by means of the vertical adjusting-screw 46; the lens is secured in the lens-board 45 with its optical axis normal to the central plane of the camera-support 40, which is carried upon two riders, 60 and 61, Fig. 3, and connected therewith by a pair of bolts 56 and a pair of thumb-screws 57; said camera-support 40 carries another pair of bolts 58, both pairs of bolts lying in the central plane.

The riders 60 61 rest upon the lower bars of the carriage and are fixable at a number of points thereon by extending the bolts 56 outward through holes in said bars; the upper pair of bars of the carriage are also provided with holes to receive the bolts 58; said holes being so placed and numbered as to render the camera-support readily fixable at known distances from the transparent reflector and parallel to same. As shown in Fig. 2, the horizontal planes containing the centers $j\ k\ l$ and $m\ n\ o$ are parallel for the purpose of allowing the carriage as a whole to be rocked, thus inclining the optical axis of the lens without changing its perpendicular relation to the transparent reflector.

In the portable form of the apparatus shown in the drawings, Figs. 1 and 2, a bellows 22 is used to render the background of the transparent reflector 12 obscure from the front, said bellows connecting the camera-front 41 and the frame 11, to which its terminal frame 21 is attached.

In Fig. 4 is shown in dot the paths of the cords by which the curtains limiting the exposed area of the transparent reflector are adjusted; said curtains are spring retracted with the cords under tension at all times; said cords pass over pulleys, not shown, fixed inside the frame 11 at suitable points; from this frame the cords pass through hollow trunnions on which said frame is supported to suitable pulleys fixed on the frame 10 by which they are led to points on the rear side of frame 10 near the spur-axles on which said frame 10 is supported; thence, as shown in dot in Fig. 2, said cords pass to reels 62 attached to the riders 60 and 61 by friction clutches, one of which is shown in Fig. 1 at 64; each of said reels may be released by pressure of the thumb on the knob 63 and turned by the fingers of the same hand; each of said reels controlling the adjustment of one curtain.

The operation of the herein described portable form of the apparatus embodying my improvement is as follows: The operator will mark the usual position of the eye, or of a point between the eyes, by a small circle on the focusing screen; the trace on the focusing screen of the optical axis of the lens may be brought to the center of this circle by lateral adjustment of the camera-table 47 and vertical adjustment of the lens-board 45; the position of the camera-table 47 relative to the base of the camera-front 41 should then be marked 0, employing a pointer attached to one member and a scale attached to the other, or other suitable device; also the position of the lens-board relative to the camera-front is likewise marked 0; since the operator's eyes are employed with the focusing screen during the time the sitter is posing, these markings may be rendered discernible to the touch, as also, the adjusting screws 46 and 48 should be provided with a mark discernible to the touch, so that the operator may calculate the number of revolutions to be made when it becomes necessary to move the trace of the optical axis on the focusing screen. Before the sitter enters the studio the operator learns the size and general style of the portrait desired; whether the sitter is to pose himself, be posed by a second person, or leave the posing to the operator, and makes the preliminary adjustments of the apparatus accordingly. In an establishment equipped with a series of non-portable forms of my improvement these preliminary adjustments are fixed in advance, and the sitter is directed to the particular station adapted to the production of the style of photograph he desires.

In Figs. 1 and 2 the apparatus is shown adjusted for portraying the head and shoulders of a seated figure with a direct gaze and posing himself, except that the auxiliary mirrors 2 should be removed; that is to say, the sitter's station is shown in the central plane of the apparatus, the line between the probable position of the sitter's head and the lens is normally bisected by the transparent reflector, the elevation of the lens-board and the lateral adjustment of the camera-table are each zero, the trace of the optical axis on the focusing screen lies at the center of the circle marking the usual position of the eye on the focusing screen, the camera is focused on the probable position of the sitter, the shutter release control is extended to the sitter's position, and the base is near enough to the sitter's station to admit of forward movement of the carriage as a whole if the sitter should lean backward, or backward movement of the carriage as a whole if the sitter should lean forward of the probable position.

When the sitter enters the studio and occupies the sitter's station, the operator begins the final adjustment of the apparatus, always keeping the sitter in focus by moving the carriage as a whole; if the eye does not appear at the circle on the focusing screen containing the trace of the optical axis, any lateral variation is to be corrected either by causing the sitter to move as desired by partially drawing one of the side curtains, or by turning the whole apparatus slightly on its casters; variation from the probable position in the vertical direction is to be corrected by turning the hand-wheel 43 as required. When the image of the eye on the focusing screen has been brought to coincide with the trace of the optical axis by these adjustments, the operator then adjusts the curtains, guided by their images at the edges of the focusing screen; if the sitter is satisfied with this placing relative to the edges of the plate, the automatic-timing shutter is then set, and the slide drawn, after which the sitter may cause the exposure when ready; meanwhile the operator preserves the conditions thus established by readjustments when necessary to compensate for further movement on the part of the sitter.

In case the sitter desires another placing of the image relative to the boundaries of the plate, he will shift his position after the curtains have been adjusted; the operator will then note the variation of the image of the eye from the trace of the optical axis as shown to him by the small circle on the focusing screen, and will calculate the number of turns of the vertical and lateral adjusting screws—knowing their pitch—necessary to bring about the coincidence of the trace of the optical axis and the image of the eye. The new position of the eye should be temporarily marked on the focusing screen, and the calculated turns of the adjusting screws then made, after which the image of the eye will be brought back to said temporarily marked position by adjustment of the hand-wheel 43 for vertical variation, and by adjustment for lateral variation as in the first place, that is, by causing the sitter to move or by turning the whole apparatus on its casters; the curtains are then readjusted, the shutter set, the slide drawn, and the operator maintains the conditions while awaiting the sitter's release of the shutter.

The non-portable form of the apparatus diagrammed in Figs. 18 and 19 is operated in a similar manner, the camera box being movably mounted in the rear wall of an inclosed carriage, with means for making the above described lateral and vertical adjustments.

The non-portable form of the apparatus diagrammed in Figs. 16 and 17 is operated in a similar manner in so far as securing the coincidence of the trace of the optical axis and the image of the sitter's eye on the focusing screen, but differently in finding the distance from the transparent reflector at which the lens must be placed; for this purpose use is made of the small mirrors M and L, M being in the form of a narrow strip and placed normal to the plane of the transparent reflector in such a position as to receive a ray from the eye of the sitter and reflect same into the operating room through an inconspicuous opening in the partition; the small mirror L is attached to the lens mounting and adapted to receive and reflect said ray to the eye of the operator when the camera is properly placed, and the focusing is done by the focusing screw of the camera box and not by moving the carriage as a whole.

Having thus described my invention what I claim and desire to secure by Letters Patent is:

1. In a photographic apparatus, a photographic lens, in combination with means for observing the contents of a cone of light whose apex is said photographic lens by interposing a transparent screen having a reflecting surface through which said cone of light is transmitted to said lens and by which rays of light having a common source and a common path with the light of said cone from the source to the said screen are reflected to an observer and means for indicating to the operator what adjustment is necessary to obtain said position.

2. A photographic portrait apparatus comprising a transparent screen, having a reflecting surface adapted to reflect rays of light emanating from a sitter for a photograph and from that portion only of the background to be included in the photograph to an observer, and a camera adapted to receive and record rays of light coinciding with said reflected rays along that portion of their common path between their common source and said transparent screen, but which are transmitted through said screen to said camera.

3. A photographic portrait apparatus comprising, a transparent screen having a reflecting surface adapted to reflect rays of light emanating from a sitter to an observer, a camera adapted to receive and record rays of light coinciding with said reflected rays along that portion of their common path between their source and said screen, but which are transmitted through said screen to said camera, and means for indicating to the operator what adjustment is necessary to obtain said position, and a shutter-release under control of said observer.

4. In an apparatus for photographic portraiture, in combination, a camera adapted to receive and record actinic rays emanating from the subject for a photograph, and a screen transparent to said actinic rays and having a reflecting surface adapted to reflect to an observer, visual rays having a common path with said actinic rays from their source to said reflecting surface and means for indicating to the operator what adjustment is necessary to obtain said position.

5. A photographic portrait apparatus comprising, a camera mounted upon a carriage, a transparent screen having a reflecting surface mounted upon the same carriage and adapted to reflect to an observer an approximate fac-simile of the image formed in said camera and means for indicating to the operator what adjustment is necessary to obtain said position.

6. In an apparatus for photographic portraiture, a medium interposed in the path of light rays entering said apparatus, through which medium a homogeneous portion of said rays is transmitted and by which medium a homogeneous portion of said rays is reflected to an observer, in combination with means of recording said transmitted rays and means for indicating to the operator what adjustment is necessary to obtain said position.

ALLAN D. RISLEY.

Witnesses:
W. M. McDOUGALL,
DANL. F. REISENWEBER.